United States Patent [19]
Ala et al.

[11] Patent Number: 5,764,728
[45] Date of Patent: Jun. 9, 1998

[54] SILENT MONITORING AGENT IDS

[75] Inventors: Glenn Ala, Kanata; A. Ian Duncan, Stittsville, both of Canada

[73] Assignee: Mitel Corporation, Kanata, Canada

[21] Appl. No.: 671,937

[22] Filed: Jun. 28, 1996

[51] Int. Cl.$^6$ .............. H04M 1/24; H04M 3/08; H04M 3/22

[52] U.S. Cl. .............. 379/35; 379/34; 379/112; 379/265

[58] Field of Search .............. 379/35, 113, 265, 379/266, 158, 205, 308, 34, 202, 309

[56] References Cited

U.S. PATENT DOCUMENTS

| | | | |
|---|---|---|---|
| 5,239,460 | 8/1993 | LaRoche | 364/401 |
| 5,535,256 | 7/1996 | Maloney et al. | 379/265 |
| 5,696,811 | 12/1997 | Maloney et al. | 379/265 |

FOREIGN PATENT DOCUMENTS

0644510 A2   9/1994   European Pat. Off. .

OTHER PUBLICATIONS

Patent Abstracts of Japan, vol. 16, No. 392, p. 153, (E1251) & JP4129365 (Fujitsu Ltd).

*Primary Examiner*—Curtis A. Kuntz
*Assistant Examiner*—Binh K. Tieu
*Attorney, Agent, or Firm*—Pascal & Associates

[57] ABSTRACT

A method of silent monitoring in a telephone system by a monitor comprising storing in a first table in a memory, correspondence between an agent identifier and a telephone set directory number used by the agent, requesting silent monitoring of the agent using the identifier, checking the table to determine the directory number of the telephone set corresponding to the agent, creating and storing a record containing the directory number, an identifier of the monitor and the agent identifier, in the event a telephone call is in process using the telephone set, conferencing a telephone set used by the monitor with the telephone set used by the agent, using a one way audio path toward the telephone set used by the monitor, in the event the telephone call in process clears, maintaining the record until the telephone set used by the monitor has gone on-hook, and continuing to monitor subsequent calls involving the telephone set used by the agent prior to the telephone set used by the monitor going on-hook, maintaining the record for global access by processes in the telephone system as long as the record has been maintained, and blocking silent monitoring of the agent by other telephone sets used by other monitors as long as the record is maintained.

6 Claims, 3 Drawing Sheets

| AGENT ID. | CLASS OF SERVICE |
|---|---|
| 501 | 1 |
| 502 | 1 |
| ... | ... |

FIG. 2A

| AGENT ID. | PHONE NO. |
|---|---|
| 501 | 1200 |
| 502 | 1201 |
| 503 | NIL |
| ... | ... |

FIG. 2B

| PHONE NO. | AGENT ID. |
|---|---|
| 1200 | 501 |
| 1201 | 502 |
| ... | ... |

FIG. 2C

```
1201 - EXTENSION
SUPERVISOR - PROCESS 10
502 - AGENT 10
```

SILENT MONITOR RECORD

FIG. 3

GROUP #8888

| MEMBER | AGENT ID. | AGENT NAME |
|--------|-----------|------------|
| 1 | 501 | J. BOND |
| 2 | 502 | J. SMITH |
| 3 | 503 | . |
| . | . | . |
| . | . | . |

FIG. 4

```
8888
SUPERVISOR'S PROCESS ID
MONITOR ACTIVE
NEXT MONITOR MEMBER
```

FIG. 5

SILENT MONITORING AGENT IDS

FIELD OF THE INVENTION

This invention relates to the field of telephony, and in particular to a method of silent monitoring of telephone calls.

BACKGROUND TO THE INVENTION

Some telephone systems provide for the service of silent monitoring of telephone calls. For example, a telemarketing concern may use the system to allow supervisors to monitor the kinds of concerns that potential customers may have about products or services being offered, the efficiency of agents may be monitored, agents may request supervisors to listen in to calls to witness abusive language, etc.

Such systems typically have the characteristic of plural agents serving a large number of incoming telephone calls, with calls being routed to the longest idle agent. Agents are assigned to telephone lines (sets), and monitoring of calls occurs by the supervisor (henceforth referred to as a monitor) requesting a one-way audio path conference with the line used by the agent, whereupon the monitor can listen to the call without being able to speak or interfere audibly with the call.

The prior art systems have had several problems. For example, if agents change telephone lines for various reasons, such as out-of-order line circuits, switching of desks, etc. monitoring of a particular line will not result in monitoring of a particular desired agent with certainty.

In addition, in some systems if several monitors request monitoring of the telephone of a particular agent, they will all be conferenced to that same agent, unknown to each other, which is inefficient use of monitors.

Further, it is possible for an agent to log out during a call in progress, which could bar monitoring of the call in progress. This can be undesirable, because the call may revert to prohibited use of a business line for personal purposes.

SUMMARY OF THE INVENTION

It has been found that the above problems can be averted by storing in a table a correspondence between an agent identifier and a telephone line, and by storing a monitoring record. Monitoring is requested of an agent using the agent identifier. The table is looked up, to determine which telephone line, identified by directory number (e.g. extension number), should be used by the telephone system in the silent monitoring conference. When an agent logs in, he uses his agent identifier, and the telephone system automatically determines which telephone line he is using. The telephone set then conferences the monitor telephone set with that telephone line when the agent identifier is requested, and the line that the agent is using enters a talk state.

The monitoring record is established when a monitoring function is requested. The monitoring record is globally available to the telephone system as long as it exists. When another monitoring function to the same agent is received from another monitor, the telephone system finds the record, and bars access of any other monitor from conferencing with that agent's telephone set.

The record is erased under circumstances in which the monitoring request disappears. Under some circumstances monitoring will continue even after the monitoring request disappears, such as if the agent of a monitored call in process logs off during the progress of a call, until the call has been completed. Other monitors will be barred from monitoring the agent's telephone line during this remaining progress of the call, since the agent's identification will have been removed from the table, and the telephone system will not be able to find a correspondence between the agent's identifier and a telephone line.

In accordance with an embodiment of the invention, a method of silent monitoring in a telephone system by a monitor is comprised of storing in a first table in a memory, correspondence between an agent identifier and a telephone set directory number used by the agent, requesting silent monitoring of the agent using the identifier, checking the table to determine the directory number of the telephone set corresponding to the agent, creating and storing a record containing the directory number, an identifier of monitor and the agent identifier, in the event a telephone call is in process using the telephone set, conferencing a telephone set used by the monitor with the telephone set used by the agent, using a one way audio path toward the telephone set used by the monitor; in the event the telephone call in process clears, maintaining the record until the telephone set used by the monitor has gone on-hook, and continuing to monitor subsequent calls involving the telephone set used by the agent prior to the telephone set used by the monitor going on-hook, maintaining the record for global access by processes in the telephone system as long as it has been maintained, and blocking silent monitoring of the agent by other telephone sets used by other monitors as long as the record is maintained.

BRIEF INTRODUCTION TO THE DRAWINGS

A better understanding of the invention will be obtained by considering the detailed description below, with reference to the following drawings, in which:

FIG. 1 is a block diagram of a telephone switching system which can carry out the present invention, FIGS. 2A, 2B and 2C illustrate tables stored in a memory of the system of FIG. 1, FIG. 3 illustrates a silent monitor record used in an embodiment of the invention, FIG. 4 illustrates an agent group table, and FIG. 5 is a group silent monitor record.

DETAILED DESCRIPTION OF PREFERRED EMBODIMENTS

Figure 1:
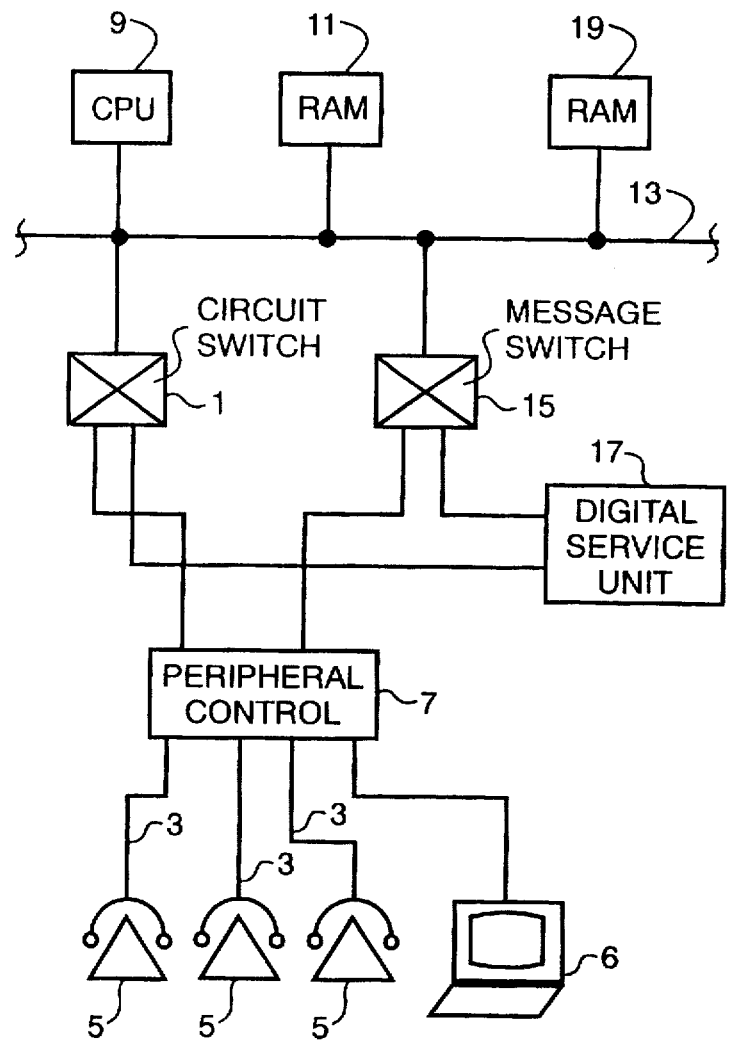

The inventive methods can be carried out on a telephone switching system such as type SX-2000 sold by Mitel Corporation, although other systems could also be used. The basic SX-2000 system, modified to accommodate the present invention, is illustrated in FIG. 1. A description of the SX-2000 system may be found in U.S. Pat. No. 4,616,360 dated Oct. 7, 1986, invented by Conrad Lewis, and U.S. Pat. No. 4,615,028 invented by Conrad Lewis et al, dated Sep. 30, 1986.

The basic system is comprised of a circuit switch 1, for switching telephone circuits between trunks and/or telephone lines 3 to which telephone sets 5 are connected, via peripheral controller or controllers 7. The circuit switch 1 is controlled by CPU 9, which operates using programs and data stored in RAM 11, via bus 13.

A message switch 15 is connected between bus 13 and peripheral controller 7, for routing control messages between the CPU 9 and the peripheral controller, and in some cases to peripherals such as smart telephone sets and/or a computer terminal 6 that interface the peripheral controller 7.

A digital service unit 17 is also connected to the circuit and message switches, for providing special functions to the system, such as conferencing, tone generation, displayable message generation, etc. Its conferencing function links plural lines together, with appropriate hybrid, terminating and audio directionality for the conference.

Detailed operation of the above system is well known from the aforenoted patents and from manuals accompanying sales of the SX-2000 switching system, and therefore a description thereof will not be reproduced here for the reason of not burdening the reader with redundant information.

However, the system is modified by the addition of a memory, RAM 19, to store the tables and records required to operate the present invention, as well as the control program therefor. It should be recognized, however, the control program can be an addition of or modification of a control program already existing in RAM 11, and that the memories 11 and 19 can be merged into one memory.

It will be recognized from the aforenoted patents that communication can be made between computer terminal 6 via peripheral controller 7 and message switch 15 and CPU 9. Alternatively computer 6 can be in communication with CPU 9 via bus 13, without signals passing through circuit and message switches 1 and 15.

A program stored in RAM 19 (or RAM 11) allows generation of a table of a kind shown in FIG. 2A, which stores class of service against agent identifiers (as distinct from class of service against telephone lines, in the prior art). These classes of services identify, for example, whether the agent identifier permits silent monitoring.

Another two tables shown in FIGS. 2B and 2C stored in RAM 19 list agent identifier against telephone line directory (e.g. extension) number, and vice versa. When an agent logs in, the telephone system automatically determines what telephone line he will be using, and the tables in FIGS. 2B and 2C are thereby updated. In the event that an agent is not logged in, the telephone line indicated is NIL, as may be seen in the table in FIG. 2B, wherein an agent with identifier 503 is not logged in, while agent 501 is logged in against telephone line 1200 and agent 502 is logged in against telephone line 1201.

The tables are created using forms as shown in FIG. 2A and FIG. 4 displayed on computer terminal 6, under control of programs stored in RAM 19. The tables shown in FIGS. 2B, 2C, 3 and 5 are tables created in memory when certain features are involved, e.g. log-in, silent monitor and are not accessible by display. The classes of service and the agent identifiers are filled into the form shown in FIG. 2A after being displayed on the display of the computer terminal. Logging in of an agent can be effected from computer terminal 6, by the agent using his telephone set to supply his identifier to the CPU via the message switch for storage in the tables; the telephone system then uses automatic line identification to identify and store the corresponding line identification (e.g. the directory number of the line) against the agent identification in the tables.

In operation, a monitor may wish to monitor e.g. agent 503, but as can be seen from the table in FIG. 2B, agent 503 is not logged in. The monitor attempts to invoke the monitor function by either dialing a control code (e.g. *51) and the agent identifier 503, or closes a dedicated or soft "monitor" key on his telephone set 5 which sends a corresponding message to the CPU 9 via peripheral control 7, message switch 15 and bus 13. The CPU 9 performs a table lookup of the table shown in FIG. 2A to determine whether agent 503 has logged in. In this case the CPU determines that agent 503 has not logged in, and sends to the monitor's telephone set a tone from digital service unit 17 indicating that agent 503 is logged out, or sends to the display of the monitor's telephone set a display message "LOGGED OUT", generated in service unit 17, via circuit switch 17.

In the case that the monitor has requested agent 502 instead of agent 503, the table lookup is performed and CPU 9 finds that agent 502 is logged onto extension 1201. It also looks up the table shown in FIG. 2 and determines that the class of service against agent 502 permits silent monitoring.

In response to the latter findings, the CPU under control of a program stored in RAM 19 generates a silent monitor record 21, as shown in FIG. 3. Record 21 contains the extension number (e.g. 1201) of the agent being or to be monitored, an identifier of the monitor (e.g. supervisor, process 10), and the agent identifier (e.g. 503).

In the case in which the agent has a call in progress, CPU under control of a program stored in RAM 19 sends the record to the agent's call process (program) stored in RAM 11, instructing it to create a monitor conference using digital service circuit 17 in a prior art manner. The agent's call process can be determined from the record 21 since it carries the extension number of the agent to be monitored. The agent's call process instructs the conference manager program in digital service unit 17 via message switch 15 to form a conference with the call in progress of extension 1201, which includes a one-way audio path between the conference point between the agent and a second party, to the telephone set used by the monitor.

When the second party hangs up, the conference manager program is notified by CPU 9 to tear down the conference. The monitor line, however, is placed in a "wait state", e.g. on hold, which can be done by connecting it to a terminating resistor in digital services unit 17, while breaking the conference connection to line 1201. The silent monitoring record 21 is not deleted, however, as long as the monitor's telephone set is still off hook.

When the monitor hangs up, a supervisory message is sent in a well known manner to CPU 9, which, using a program stored in RAM 19, deletes the silent monitoring record. When the record is in existence, the CPU assumes that the line identified in it is to be monitored by the identified monitor, and preferably prohibits silent monitoring by any other monitor. Once the record has been deleted, any other monitor can request to monitor the same agent, identified by agent identifier, and a new silent monitoring record is established, which is used by the conference manager as described above, and acts as a bar against other monitors silent monitoring the identified line.

The conference manager thus interacts with the call process programs of all three parties to the silent monitoring, the agent, the second party, and the monitor, while each of those call process programs interact with the peripheral driver programs for each of the telephones in peripheral control 7.

If the monitor is in a wait state, the described process repeats, whereupon when the agent becomes engaged in a call, the CPU 9 recognizes that the silent monitoring record exists after checking all the silent monitoring records stored in RAM 19, and sends the above-described instruction to the conference manager program to set up the silent monitoring conference, which sets it up by communicating with the call process programs of the agent, the second party and the monitor as described above and removes the wait state hold condition on the monitor line.

This process is repeated until the monitor decides to hang up, at which time the silent monitoring record 21 is deleted by CPU 9. CPU 9 also instructs the digital service unit 17 to remove the monitor's conference connection to the agent's line and the second party's line. In the event of termination of the call and the initiation of a further call involving agent 502, no silent monitoring will occur because when setting up the call no silent monitoring record will be found by CPU 9 searching the silent monitoring records in RAM 19.

The agent can log out in two possible circumstances: (a) no call is in progress, or (b) during a call in progress. This can be done by transmitting a signal (e.g. *21, or by closing a predetermined telephone set key which causes transmission of a corresponding signal) which is detected by a tone detector in services unit 17 controlled by the CPU 9 via circuit switch 1.

If no call is in progress, in response to the logout signal and agent identifier, the CPU searches for and deletes any silent monitoring record that may exist related to the agent that has logged out. It also updates the tables shown in FIGS. 2B and 2C to delete reference to a line against the agent identifier. In case a monitor request is made against the agent that has logged out, the request will be refused as indicated earlier in this specification.

In case a call is in progress when the logout command is made by the agent, tables 2B and 2C are updated to reflect this by the CPU 9. However, the silent monitoring is preferably continued and is allowed to "finish". When the agent hangs up a check is made by the monitor process program in RAM 19 to see if a silent monitor exists for the agent, and if the monitor is the one which is waiting to monitor. Since tables 2B and 2C have been updated to reflect the agent is no longer logged in, the monitor record will be deleted. The CPU causes silent monitoring connection to terminate, and sends data to the monitor telephone or display for translation to a special tone, or to display a notification such as LOGGED OUT. The monitor telephone is then supplied with reorder tone. Further silent monitoring of the agent will not occur.

It should be noted that while the above process is specific to monitoring of agents, the same telephone system can accommodate a request to monitor a telephone line identified by directory number, as in the prior art. In this case, however, a program in RAM 19 should cause the old silent monitoring program to check for silent monitoring records that may be in existence related to the particular line identified by directory number which is desired to be monitored. If one exists, monitoring of the line should be barred by a different monitor, but not barred if it is the same monitor as is identified in the existing record that has requested monitoring of the line. The identity of both the line and of the monitor or existing records are identified in the silent monitoring record, which allows the CPU to determine which monitor had requested which agent to be monitored, and which line this corresponds to.

If the record had been deleted, any monitor can request monitoring of a line (as distinct from an agent). If a silent monitoring record exists, no other monitor can request monitoring of a line, since the record blocks access to it, but the line would be monitored by the first monitor due to the existing record identifying the line through the request to monitor the agent.

It should be noted that agent groups can be silent monitored. In this case, a group number is assigned to a table stored in RAM 19 or RAM 11, which table carries member numbers against agent identifiers and agent names, as shown in FIG. 4.

If a monitor requests silent monitoring of this group (e.g. 8888), at least one agent in the group must be logged in for the request to be accepted. The agent must also have the class of service that allows monitoring. In response to a request from the monitor to silent monitor the group, the identity of the group is input with a request to silent monitor, as described above. After checking the table of FIG. 4 stored in RAM 19, the identities of the agents as well as their directory numbers and classes of service are retrieved from the table shown in FIG. 2A. A group silent monitor record as shown in FIG. 5 is then created by the CPU.

Once the group silent monitor record is created, another program stored in RAM 19 causes the CPU to check at predetermined intervals (e.g. every 2 seconds) to see if any of the logged in agents in the group have gone into the talk state. If so, this program sends a message to the agent's program to start silent monitoring on behalf of the monitor, as described earlier.

The presence of the record can block other monitors from silent monitoring the agent's telephones of the group.

The group silent monitor record can be deleted in a manner as described above if (a) the monitor hangs up, or (b) the last agent in the group logs out (i) when the monitor is silent monitoring or (ii) when the monitor is waiting to silent monitor. A message is sent to the monitor's telephone set or display to the effect of LOGGED OUT, and reorder tone is sent to the monitor's telephone set.

A person understanding this invention may now conceive of alternative structures and embodiments or variations of the above. All those which fall within the scope of the claims appended hereto are considered to be part of the present invention.

We claim:

1. A method of silent monitoring an agent having an identifier in a telephone system by a monitor comprising:
    (a) storing in a first table in a memory, correspondence between an agent identifier and a telephone set directory number currently being used by the agent,
    (b) requesting silent monitoring of the agent using said identifier,
    (c) checking the table to determine the directory number of the telephone set corresponding to the agent,
    (d) creating and storing a record containing the directory number, an identifier of the monitor and the agent identifier,
    (e) in the event a telephone call is in process using the telephone set currently being used by the agent, conferencing a telephone set used by the monitor with the telephone set used by the agent, using a one way audio path toward the telephone set used by the monitor,
    (f) in the event the telephone call in process clears, maintaining said record until the telephone set used by the monitor has gone on-hook, and continuing to monitor subsequent calls involving the telephone set used by the agent prior to the telephone set used by the monitor going on-hook,
    (g) maintaining said record for global access by processes in the telephone system as long as said monitor has not gone on-hook, and
    (h) blocking silent monitoring of said agent by other telephone sets used by other monitors as long as said record is maintained.

2. A method as defined in claim 1 including storing said correspondence in said table upon logging in of an agent against a particular telephone set in the telephone system.

3. A method as defined in claim 2 including indicating a null directory number against an agent identifier in said table in the event of an agent having not logged in or having logged out.

4. A method as defined in claim 3 including maintaining silent monitoring of a call in process of a telephone set used by said agent in the event of logging out of said agent prior to termination of said call process, and deleting said record.

5. A method as defined in claim 4 including terminating silent monitoring upon termination of said call in process.

6. A method as defined in claim 2 including deleting said record upon the agent logging out at a time other than during a call in process.

* * * * *